Sept. 3, 1940.   N. S. LUNDBERG ET AL   2,213,251
MILLING MACHINE
Filed Jan. 9, 1936    7 Sheets-Sheet 1

Inventors
Nels S. Lundberg
and
Charles B. DeVlieg
By Beaman & Langford
Attorney

Inventors
Nels S. Lundberg
and
Charles B. DeVlieg
By Beaman & Langford
Attorney

Sept. 3, 1940.   N. S. LUNDBERG ET AL   2,213,251
MILLING MACHINE
Filed Jan. 9, 1936   7 Sheets-Sheet 5

Inventors
Nels S. Lundberg
and
Charles B. DeVlieg
By Beaman & Langford
Attorney

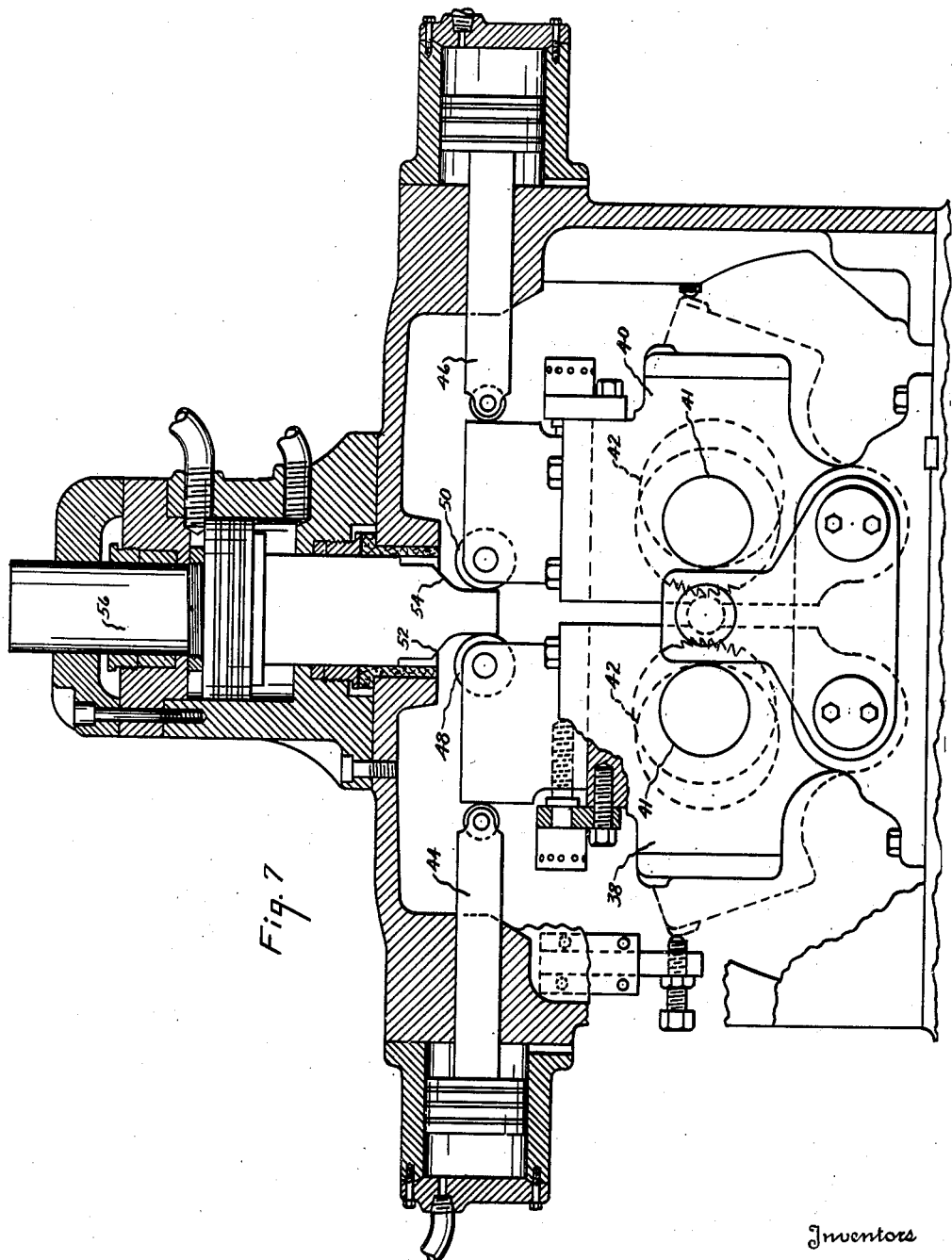

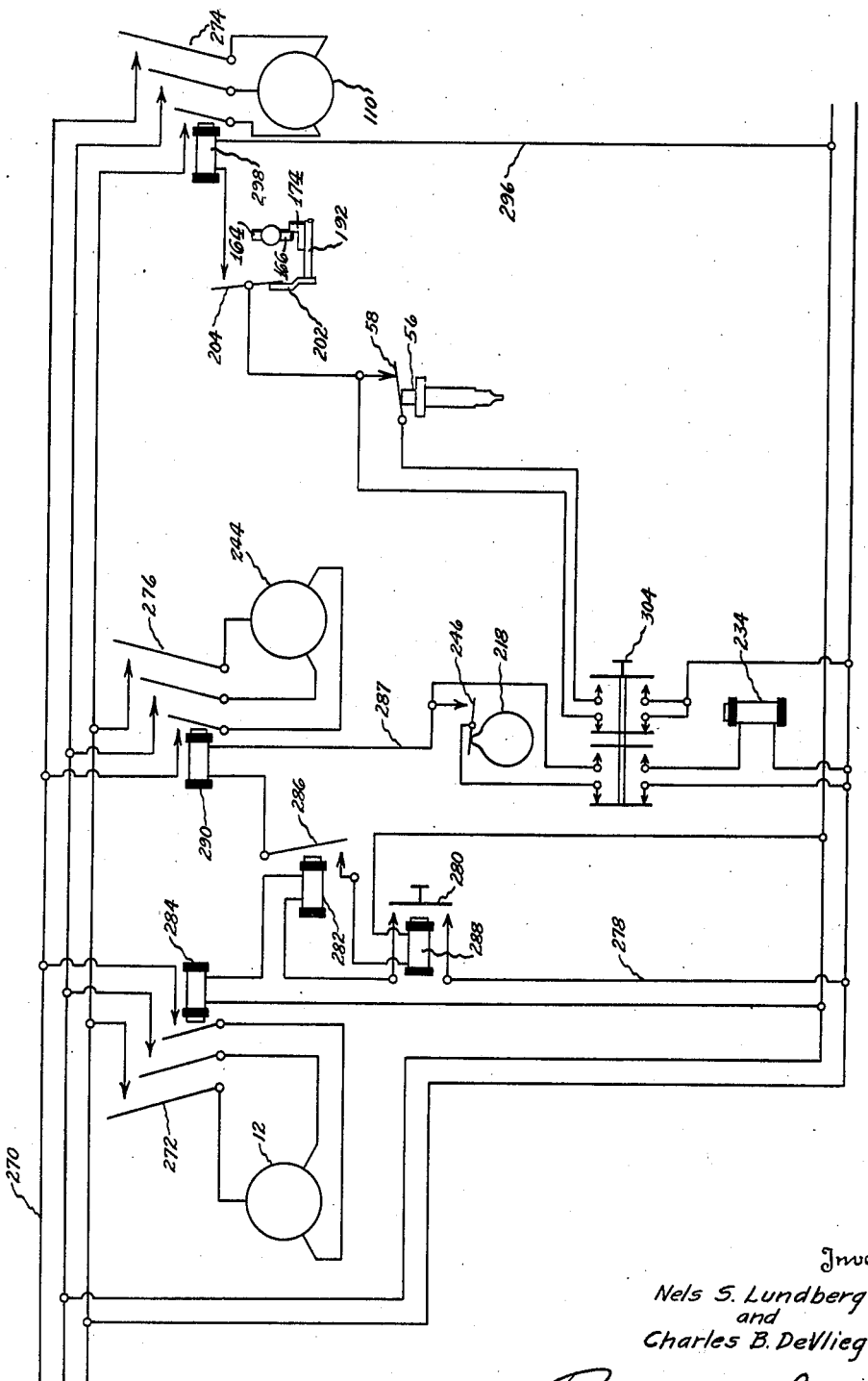

Patented Sept. 3, 1940

2,213,251

UNITED STATES PATENT OFFICE 2,213,251

MILLING MACHINE

Nels S. Lundberg and Charles B. De Vlieg, Jackson, Mich., assignors, by mesne assignments, to The Bullard Company, Bridgeport, Conn.

Application January 9, 1936, Serial No. 58,247

15 Claims. (Cl. 90—20)

This invention relates to improvements in machine tools having particular reference to "turn milling" and other comparable types of machines and constitutes a continuation-in-part of our copending application Ser. No. 29,834, filed July 5, 1935, patent number 2,036,967 granted April 7, 1936.

Flexibility of operation of a machine tool is of major importance if it is to have maximum utility, as the operation of the cutting tool and work holding structures necessitate frequent relative adjustment, particularly, as to speed of rotation as changes occur in the shape and material of the work being machined. Such flexibility of operation is of particular advantage in "turn milling" as both the cutting tools and work are relatively rotated during the machining operation and changes in diameter of the work must be taken into consideration in obtaining an efficient cutting speed with reference to the finish of the work and the life of the cutters.

As fully treated in our above mentioned application, rigidity of construction and operation of the machine tool for successful "turn milling" is a prerequisite. In our prior application such characteristics were satisfactorily obtained through the use of hydraulically operated feeding and work holding mechanism. In the present improvement a hydraulic press is still being employed, however, increased flexibility of operation of the machine has been accomplished by the independent operation of the several cooperating elements of the machine and the controlling of the operation of these elements according to the desired cycle.

Another feature of the present invention resides in mechanism for holding the work stationary while the milling cutters are being fed in and then rotating the work relative to the cutters for one or more revolutions or fractions of single revolutions to machine the work along circular arcs. In this connection, a further feature of the invention is present in the mechanism for stopping the work spindle in a predetermined position for loading.

These and other features of the present invention residing in details of construction and combination and arrangement of parts will become apparent upon the consideration of the following description.

Figure 1:
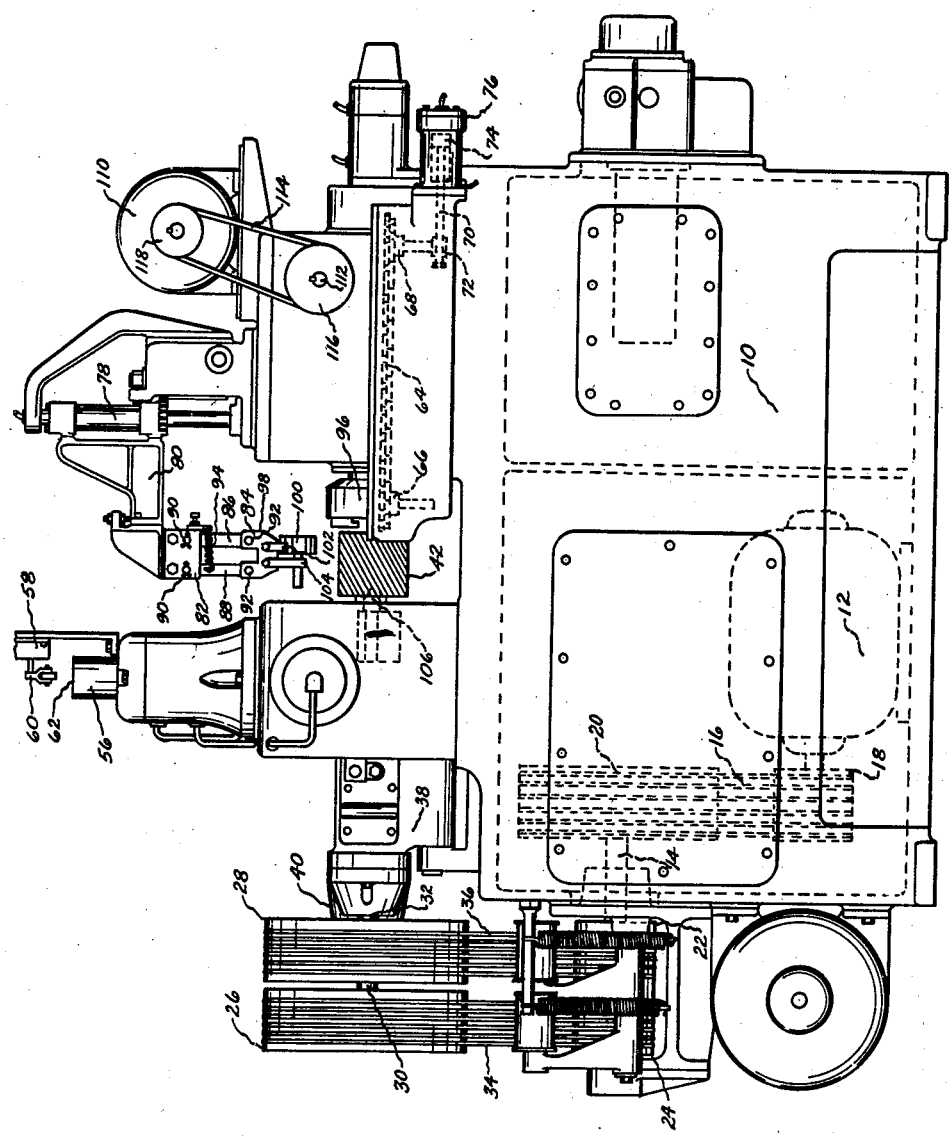
Figure 2:
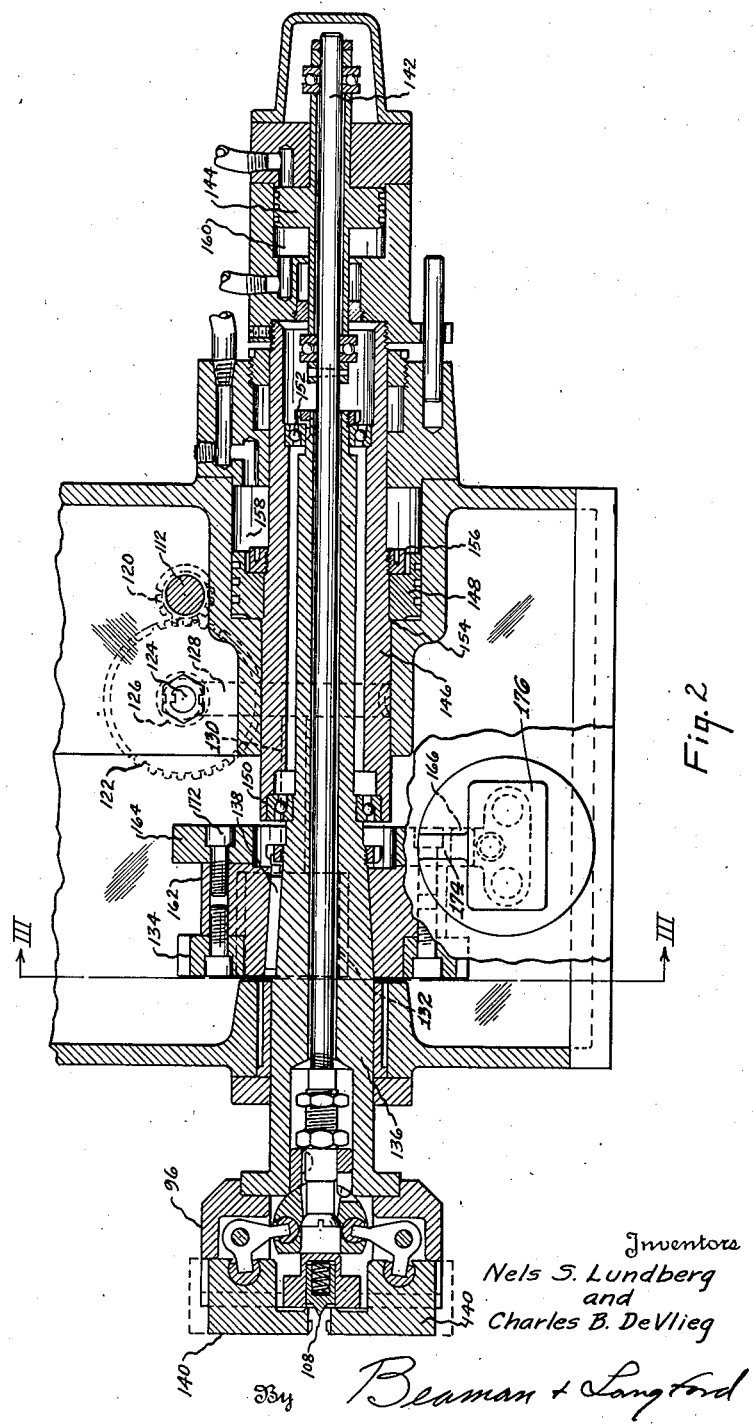
Figure 3:
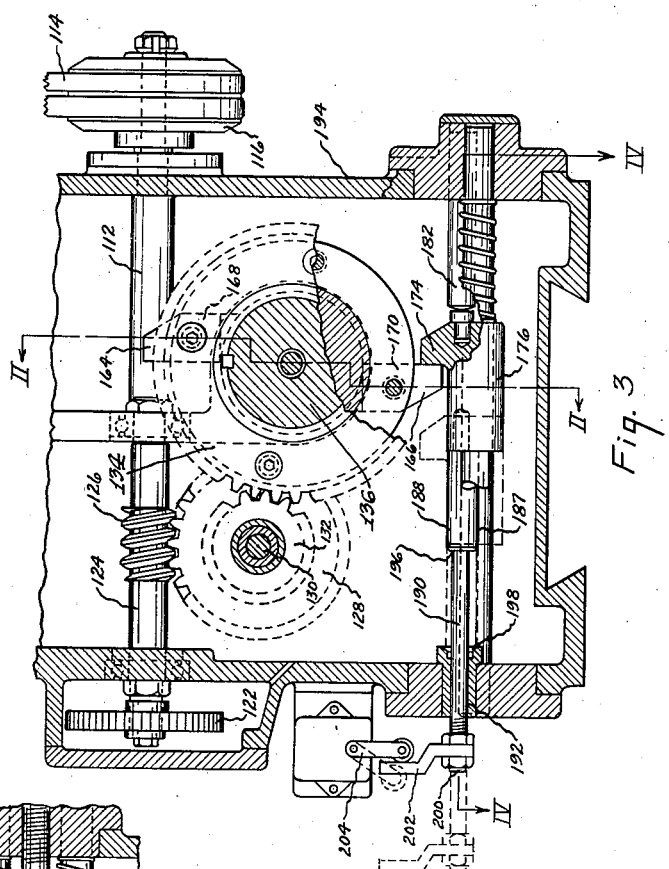
Figure 4:
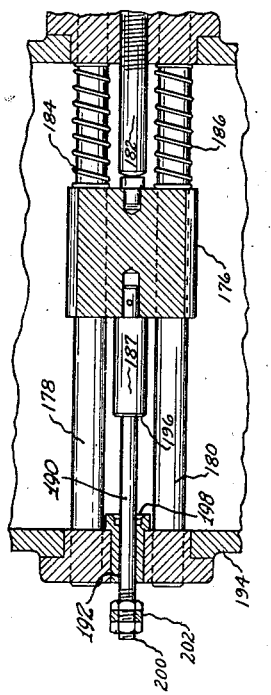
Figure 5:
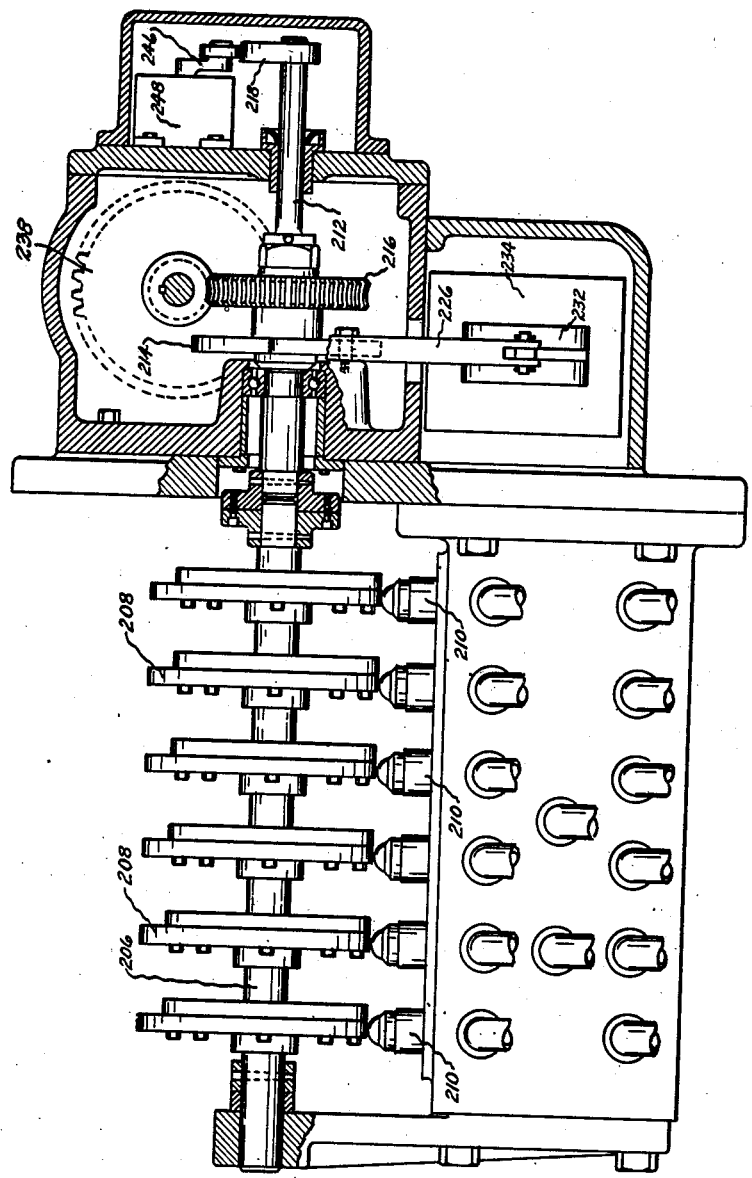
Figure 6:
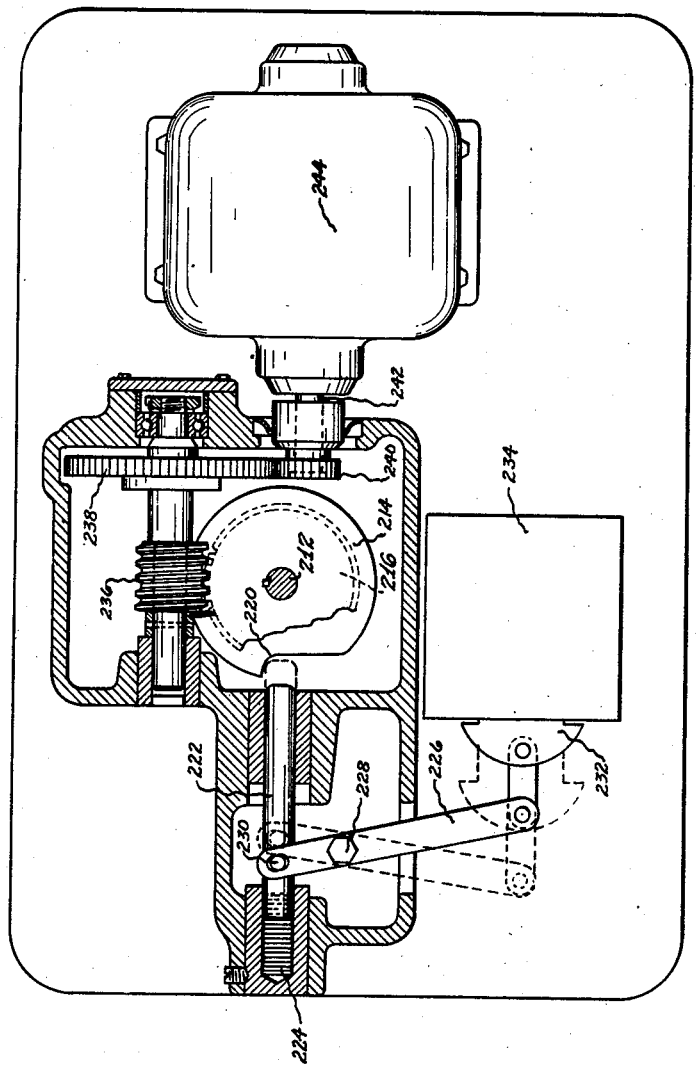

In the accompanying drawings, wherein the preferred form of the invention is illustrated, Fig. 1 is a side elevational view of a machine tool constructed in accordance with the present invention, Fig. 2 is a cross-sectional view through the work spindle and associated structure, Fig. 3 is a cross-sectional view of the mechanism for stopping the work spindle in a predetermined position taken on line III—III of Fig. 2, Fig. 4 is a cross-sectional view taken on line IV—IV of the spindle stopping mechanism, Figs. 5 and 6 are detailed views partly shown in cross-section of the cam shaft and motor for control of the hydraulic system, Fig. 7 is a cross-sectional view through the spindle carriage feeding and controlling structure, and Fig. 8 is a diagrammatic representation of the electrical control system of the machine.

Generally speaking, we contemplate a machine tool of the "turn milling" or other comparable type having individual motors or other suitable sources of power for the major cooperating elements, and individually controlled in a predetermined manner to carry out the desired cycle of operation of the machine. In the illustrated form of the invention the relatively movable rotated milling cutter spindles are driven by one motor while the work holding spindle is individually driven from a different motor. At least in part, the operation of the work spindle motor is controlled by the cutter feeding mechanism. For regulating the cycle of the machine numerous hydraulically operated units are controlled from a cam shaft likewise driven by an individual motor. All the several motors are cut in and out of operation by suitable mechanism synchronized with the various steps of operation of the machine. With this arrangement the cycle of operation of the machine may be varied at will without change or effect upon the speed of rotation of the work and cutter spindles. Likewise, the R. P. M. of the cutter spindles may be varied with reference to that of the work spindle, and vice versa, without any proportional relation therebetween as is the case when a common drive is provided for both the work and cutter spindles and change gears or similar adjustment means employed.

In the embodiment disclosed a pair of opposed milling cutters are relatively fed with reference to the work with the latter in a non-rotating state until the work has been milled upon opposite sides to a predetermined depth. The work is then rotated through a half or full revolution and the work holder and work brought to a stop in a predetermined position for reloading. While the illustrated construction is only capable of being rotated through a single revolution, after the cutters have been fed to depth, we contemplate the rotation of the work through more than one complete revolution, particularly where the cutters are to take, in succession, roughing and finishing cuts. Moreover, insofar as this phase of the invention is concerned, we do not limit ourselves to the employment of individual motors for providing relative and periodic rotation between the cutter spindle and the work holder spindle.

Referring to Fig. 1, the general construction of the machine corresponds to that shown in our copending application above mentioned. Within the main frame 10 is housed a motor 12 driving a shaft 14 through V-belts 16 running over pulleys 18 and 20. Upon the shaft 14 are pulleys 20 and 22 driving pulleys 26 and 28 upon shafts 30 and 32 through V-belts 34 and 36. The shafts 30 and 32 are carried within tool carriages 38 and 40 pivoted in the frame 10, (Fig. 7). Mounted within the carriages 38 and 40 are cutter spindles 41 upon which the opposed milling cutters 42 are mounted for rotation, all in the identical manner as more fully disclosed in our copending application. For feeding the cutters 42 relative to the work, the hydraulically operated plungers 44 and 46 urge the cam followers 48 and 50 upon the carriages into contact with the cam surfaces 52 and 54 of the cam 56. At the lower end of the cam 56, the surfaces 52 and 54 are substantially parallel so as to define the limit of the feeding action and to enable the cam to have sufficient vertical movement to actuate the limit switch 58 Fig. 1 through contact between the rocker arm 60 and the top 62 of the cam 56.

A manually loaded work conveyer 64 in the form of an endless chain is moved step by step about sprockets 66 and 68 by a rack 70 engaging with a pinion 72 clutched to the sprocket 68 upon movement of the rack 70 in one direction. As shown the rack 70 is connected to a piston 74 operating in the cylinder 76 into which fluid under pressure is directed.

The work loading structure 78 may be identical with that disclosed in our copending application above mentioned with the only departure residing in the work engaging means supported upon the swinging arm. As shown, the parts 82, 84, 86 and 88 form a parallelogram with the parts 86 and 88 pivoted to the parts 82 and 84 at 90 and 92. The spring 94 normally holds the structure in the position shown, however, upon being lowered between the cutters 42, the work holder 96, upon axial movement, engages with the shoulder 98 and moves the work 100, held by the resilient fingers 102 and 104, into engagement with the stationary center 106 supported from the frame 10 and located between the cutters and in alignment with the center 108 of the work holder 96.

The mechanism for rotating the work holder 96 comprises a motor 110 which drives the shaft 112 through a V-belt 114 running over pulleys 116 and 118. Shaft 112 has a gear 120 at its left hand end (see Figs. 2 and 3) which meshes with a gear 122 in the change gear box. This gear 122 is shown supported upon a shaft 124 carrying a worm 126 which drives the worm gear 128 upon the longitudinal shaft 130. A wide gear 132 is keyed to the shaft 130 and meshes with the gear 134 keyed to the work holder spindle 136 as at 138 (Fig. 2).

The work holder 96 may be of any suitable construction with the jaws 140 adapted to be opened and closed upon the work 100 through axial movement of the rod 142 by the piston 144. Axial movement of the spindle 136 is accomplished through the connection between the spindle 136 and the sleeve 146 with the piston 148. As will appear from inspection, the spindle 136 is rotatably supported within the sleeve 146 upon bearings 150 and 152 and the piston 148 is fixed to the sleeve 146 between the shoulder 154 and nut 156. Fluid under pressure directed into the cylinder 158 and 160 upon alternate sides of the pistons 144 and 148 will impart axial movement to the rod 142 and spindle 136 as desired.

Mechanism for controlling the rotation of the work holder 96 and its spindle 136 will now be described. In the illustrated embodiment the hub 162, keyed to the spindle 136 at 138, carries a pair of lugs 164 and 166 spaced 180° apart. Preferably these lugs are positioned within slots in the outer face of the hub 162 and are removably secured by stud bolts 172. With the spindle 136 in its extreme outward position as shown in Fig. 2, the lugs 164 and 166 will be positioned in the path of the abutment 174 upon the stop carriage 176 (Fig. 3). Upon rotation of the spindle 136, the lug 166, for example, will engage the abutment 174 with the carriage 176 in the dotted line position and slides the same to the right as viewed in Fig. 3 upon the guiding supports 178 and 180, to the full line position abutting the stop 182. Movement of the carriage 176 to the right compresses the springs 184 and 186 (Fig. 4) to store up sufficient energy to return the carriage to the dotted line position shown in Fig. 3 upon relative displacement of the lug 166 out of the path of the abutment 174 as will be more fully discussed hereinafter. To limit, as well as cushion the movement of the carriage 176 to the left, under the action of the springs 184 and 186, a rod 187 is provided having a plunger portion 188 and a reduced portion 190 extending through the opening 192 in the side of the housing 194. Between the two sections of the rod 187 is provided a stop 196 which enters the recess 198. As the recess is filled with oil confined in the housing 194 during operation, the close fit between the stop and the recess 198 gives a cushioning effect to the stopping action of the structure defining the recess. The outer end 200 of the rod carries a switch operating projection for operating the switch 204 at the time the carriage 176 is moved to the right as viewed in Fig. 3. As more clearly shown in Fig. 4, the rod 187 is secured to the carriage 176 and moves therewith as a unit. If the work is to be rotated through 360° then one of the lugs 164 and 166 will be omitted.

In Figs. 5 and 6 mechanism is shown for the control of the hydraulic system which includes the actuation of the feed cam 56, the feeding movement of the carriages 38 and 40, the actuation of the loading structure 78, and the axial operation of the work holder, all as fully described in our aforesaid application. A departure, however, has been made in the present invention in that an individual motor is provided for the actuation of the cam shaft 206 which carries a plurality of cams 208 for operating valves 210 controlling the admission and exhaust of fluid from the several operating cylinders. An extension 212 of the shaft 206 carries a plate 214, a worm gear 216 and a lift cam 218. The plate 214 is circular except for a notched portion 220 in which a pin 222 is urged by a spring 224 to limit counter-clockwise rotation of the plate as viewed in Fig. 6. For removing the pin 222 from the notch 220, a lever 226 pivoted at 228 engages at its upper end with the pin 222 at 230 and at its lower end with the core 232 of the solenoid 234. When the solenoid 234 is energized the lever 226 and pin 222 are moved from the dotted to the full line position shown. Upon rotation of the shaft 212 through the rotation of the worm gear 216, worm 236, gear 238, and pinion 240 on the shaft 242 of the motor 244, the cam 218 rocks the arm 246 to actuate the switch 248 for a purpose to be described later.

For a complete understanding of the invention a typical electrical control arrangement is shown in Fig. 8. It is to be understood, however, that the electrical circuit illustrated has been materially simplified for the sake of convenience of description and that conventional overload circuit and cut out circuits upon motor failure, and the like, have been omitted. Moreover, in practice as the length of the operating cycle will vary with the work being machined in some cases it is desirable to interrupt the operation of the motor 244 rotating the cam shaft 206 to stop the shaft 206 in a position holding the valves open leading to the hydraulic cylinder associated with the cutter carriages and the feed cam; the cam motor 244 being cut back into operation at a later stage in the cycle of operation in any suitable manner such as by a switch closed upon the interruption of the operation of the work spindle motor. In this manner the length of the cycle of operation may be varied without the necessity of arranging the cam upon the cam shaft 206 and driving the same at such speeds as to enable the same to be continuously rotated during the entire cycle.

Referring to Fig. 8, the preferred arrangement of the electrical circuit for the apparatus is adapted to stop it and lock it in position with a work piece clamped within head 96; the feed cam 56 in its upper position, closing limit switch 58; lug 164 or 166 in engagement with abutment 174, holding switch 204 open; and plungers 44–46 withdrawn permitting carriages 38, 40 to assume the dotted line position (Fig. 7).

The apparatus is re-started by holding normally-open push button switch 280 closed whereupon solenoids 282 and 284 become energized. Energization of solenoid 284 will close switch 272 to start the cutter-spindle motor 12 rotating. Energization of solenoid 282 will close switch 286 in the circuit 287, but current will not flow therethrough until starting button 304 is moved to the left. This last-mentioned push-button switch is manually controlled and remains in the position in which it is placed. Movement of switch 304 to the left causes current to flow through circuit 287, including solenoids 234, 290 and 288. Solenoid 288 serves as a holding circuit for normally-open push-button switch 280. Energization of solenoid 290 closes switch 276 to start the cam shaft motor 244 rotating, while simultaneously therewith, energization of solenoid 234 withdraws locking pin 222 from disc 214 to permit rotation of cam shaft 206 (Figs. 5 and 6).

As cam shaft 206 begins to turn, the following functions occur sequentially, namely, fluid under pressure is admitted to the top of the piston on feed cam 56 causing it to move downwardly opening normally-open switch 58; fluid under pressure is admitted to the left-hand side of piston 148 and to the right-hand side of piston 144 to move spindle 136 and rod 142 axially in opposite directions, (Fig. 2) thereby moving lugs 166 and 164 from the path of element 174 to permit normally-closed switch 204 to close, and expanding jaws 140 to release the preceding work piece; cam 218 begins turning so that normally-closed switch 246 is closed; fluid under pressure is admitted to the cylinder 78 to effect locating a new work piece between the centers 106 and 108 of the tail stock and the head 96; fluid under pressure is admitted to the left side of piston 144 and to the right-hand side of piston 148 (Fig. 2) to cause axial movement of spindle 136 so that head 96 will move into position surrounding the end of the work piece and lugs 164, 166 will move into the path of element 174, and axial movement of rod 142 in the opposite direction from that of the spindle 136 to contract the jaws 140 onto the work; fluid under pressure is admitted to the far sides of pistons 44, 46 to cause the rotating cutters 42 to be brought toward each other to engage the work; and fluid under pressure is admitted to the lower side of the piston on the feed cam 56 and the upper side of said piston is vented causing upward movement of the feed cam 56 to feed the cutters 42 into the work until the followers 48, 50 engage the flat parallel surfaces on the lower end of cam 56. At this point limit switch 58 (Fig. 8) is closed, causing circuit 296 to become energized. Closing switch 58 energizes solenoid 298 which closes switch 274 starting the work spindle motor 110. Motor 110 rotates the spindle 136 and the work, through either 180° or 360° depending upon the presence of only one or both of lugs 164 and 166, until either lug moves element 174 to open switch 204 whereupon motor 110 stops. However, circuit 287 remains energized and motor 244 continues to rotate. Accordingly, the previously described sequential order of operation of the apparatus due to the rotation of cam shaft 206 begins again.

When it is desired to shut the apparatus down, push-button switch 304 is moved to the right into the position shown in Fig. 8. Movement of switch 304 to the right causes solenoid 234 to become de-energized thereby releasing pin 222 to permit it to move to the right (Fig. 6) to engage the periphery of disc 214. The construction and arrangement of the circuit of Fig. 8 permits the continued sequential order of operation until the apparatus assumes the condition wherein feed cam 56 is in its upper position; either lug 166 or 164 is in engagement with 174 holding switch 204 open; and plungers 44–46 are withdrawn, permitting carriages 38, 40 to assume the dotted line position (Fig. 7). When this condition is attained, cam 218 will open normally closed switch 246 and pin 222 will engage notch 220 of disc 214 to lock the cam shaft 206 in fixed position.

Opening of switch 246 de-energizes solenoids 290 and 288 causing switches 276 and 280 to open—the opening of switch 276 stopping motor 244. Opening of switch 280 de-energizes solenoids 282 and 284—the de-energization of 284 opening switch 272, stopping motor 12; and the de-energizing of solenoid 282 opening switch 286.

To re-start the apparatus again requires holding push-button switch 280 closed, and moving push-button switch 304 to the left as previously explained.

1. A milling machine for high productive machining of work to cylindrical section comprising work holding means adapted for rotation, side milling cutters arranged about said work and adapted for engagement therewith means mounting said cutters and work holding means with respect to each other, said milling cutters engaging the work such that each cutter resists the action of the other through the work, means for rotating said cutters about an axis parallel to the axis of rotation of said holding means, means for relatively feeding said cutters and work while said work is in a non-rotating state, means for rotating said work simultaneously with the rotation of said cutters, and means including said feeding means for rigidly holding said cutters and work holding means in fixed relation relatively to each other while the work piece is being rotated.

2. A milling machine for the high productive milling of work to cylindrical section comprising work holding means adapted for rotation, side milling cutters arranged about said work and adapted to engage therewith, means mounting said cutters and work holding means for relative movement with respect to each other, means for effecting relative feeding movement between said work and cutters while the work is in a non-rotating state, means initiated upon the completion of the relative feeding movement between said work and cutters for rotating said work holding means, and means including said feeding means for rigidly holding said cutters and work holding means in fixed relation relatively to each other while the work piece is being rotated.

3. A milling machine, work holding means adapted for rotation, a milling cutter adapted to engage with said work, means mounting said cutter and work holding means for relative movement with respect to each other, means effective to retain said work holding means in a non-rotating state during relative feeding movement between said work and cutter, means for rotating said work simultaneously with the rotation of said cutter following relative feeding movement between said work and said cutter, and means including said feeding means for rigidly holding said cutter and work holding means in fixed relation relatively to each other while the work piece is being rotated.

4. A milling machine comprising work holding means adapted for rotation, a milling cutter arranged for engagement with said work, hydraulic feed means for effecting relative movement between said work and said cutter, means for holding said work against rotation during the initial machining of the work, means controlled by said feeding means for rotating said work simultaneously with the rotation of said cutter, and means including said hydraulic feed means for rigidly clamping said cutter in fixed relation to the axis of rotation of said work holding means while said work is being rotated.

5. A milling machine, a pair of side milling cutters, a work holder for positioning work between said cutters, means mounting said cutters and work holder for movement relative to each other whereby substantially diametrically opposed portions of the work are engaged by said milling cutters, means for effecting relative feeding movement between said work holder and cutters, means for rotating said cutters during said feeding movement with said work in a non-rotating state, means for rotating said work simultaneously with said cutters following the said relative feeding movement, and means including said feeding means for rigidly holding said cutters and work holding means in fixed relation relatively to each other while the work piece is being rotated.

6. A milling machine for machining work along circular arcs comprising a rotatable work holding means, a rotatable milling cutter, means for rotating said milling cutter, hydraulic means for relatively feeding said work holder and cutter, means for rotating said work holder, said work holder rotating means being inoperative during at least the initial period of said relative feeding of said cutter and work holder, means controlled by said feeding means for rendering said work holding rotating means operative and means for effecting axial movement of said work holding means to facilitate loading and unloading of the work piece.

7. In a milling machine, the combination of a work holder, a rotatable milling cutter, hydraulic feeding means for effecting relative feeding movement between said work holder and cutter, means for rotating said cutter during said relative feeding movement to machine the work to a predetermined depth while said work and work holder are in a non-rotating state, means for rotating said work holder and work, means for effecting axial movement of said work holding means to facilitate loading and unloading of the work piece and means for rendering said work and work holder rotating means operative, said last means being controlled by said feeding means.

8. In a milling machine of the character described, a combination of a work holder, means for effecting axial movement of said work holder to facilitate loading and unloading of the work piece, means for rotating said work holder, means for rendering said work holder rotating means inoperative after said work holder has been rotated from one predetermined position to another, said last means including a stop for bringing said work holder to rest in a predetermined position for loading, said work holder being adapted to clear said stop upon axial movement of said work holder.

9. In a milling machine of the character described, a work holder having a predetermined loading position, means for rotating said work holder, means for rendering said work holder rotating means inoperative following predetermined rotation of said work holder, said means including a stop engaging with said work holder predetermining its position of rest with said work holder rotating means inoperative, and means for effecting axial movement of said work holding means to facilitate loading and unloading of the work piece and for relatively positioning said work holder and stop.

10. In a milling machine the combination of a work holder, means for rotating said work holder, means for interrupting the rotation of said work holder to bring the same to rest in a predetermined position including means for rendering said work holder rotating means inoperative and means for effecting axial movement of said work holding means to facilitate loading and unloading of the work piece.

11. The high productive method of milling cylindrical work pieces comprising holding the work for rotation, engaging opposite sides of the work with milling cutters while rotating the same with said work piece in a non-rotating state, relatively feeding said cutters and work to the desired depth, and then rotating said work simultaneously with the rotation of said cutters while rigidly maintaining said cutters in fixed relation to the axis of rotation of said work.

12. The high productive method of milling work pieces along circular arcs, comprising holding the work for rotation, engaging opposite sides of said work piece with milling cutters whereby each cutter resists the action of the other through the work, rotating said cutters with said work piece in a non-rotating state while relatively feeding said work and cutters to a predetermined depth of said work and rotating said work and cutters upon the completion of the relative feeding between said work and cutters to mill said work along a circular arc while rigidly maintaining said cutters in fixed relation to the axis of rotation of said work.

13. The method of milling a work piece along a circular arc with a rotating milling cutter comprising the steps of supporting the work for rotation, engaging opposite sides of said work with pressure applying members, at least one of which is a rotating milling cutter whereby each member resists the action of the other through the work, relatively feeding said work and milling cutter to a predetermined depth with said work in a non-rotating state, and then simultaneously rotating said work and milling cutter to machine said work along a circular arc while rigidly maintaining said cutter in fixed relation to the axis of rotation of said work.

14. The method of milling work pieces of circular cross section between opposed milling cutters which comprises: continuously rotating said opposed cutters; relatively feeding said work piece and cutters while retaining said work piece against rotation so as to cause said cutters to cut to equal depths on opposite sides of said work piece; terminating said feeding movement and rotating said work piece to machine said work piece along circular arcs while rigidly maintaining said cutters in fixed relation to the axis of rotation of said work piece.

15. In a machine of the class described, a pair of rotary tool supports, a work support, means for rotating said tool supports, independent means for rotating said work support, means for relatively feeding said supports in a manner to cause said work support to assume a position intermediate said tool supports and spaced a predetermined distance from said tool supports, means effective during said relative feeding to retain said work piece against rotation while continuously rotating said tool supports, said last means being effective substantially at completion of said feeding movement to initiate operation of said work support rotating means.

CHARLES B. DE VLIEG.
NELS S. LUNDBERG.